(12) United States Patent
Dykstal et al.

(10) Patent No.: US 9,058,240 B2
(45) Date of Patent: Jun. 16, 2015

(54) MULTI-CONTEXT REMOTE DEVELOPMENT

(71) Applicant: International Business Machines Corporation, Armonk, NY (US)

(72) Inventors: David W. Dykstal, Rochester, MN (US); Mike S. Fulton, British Columbia (CA); Dave K. McKnight, Newmarket (CA); Kushal S. Munir, Vaughan (CA); Rick L. Sawyer, Toronto (CA); Eric V. Simpson, Sharon (CA)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 13/692,486

(22) Filed: Dec. 3, 2012

(65) Prior Publication Data

US 2014/0157226 A1    Jun. 5, 2014

(51) Int. Cl.
*G06F 9/44* (2006.01)

(52) U.S. Cl.
CPC ........................................ *G06F 8/70* (2013.01)

(58) Field of Classification Search
None
See application file for complete search history.

(56) References Cited

U.S. PATENT DOCUMENTS

| | | | |
|---|---|---|---|
| 5,481,720 A * | 1/1996 | Loucks et al. | 726/21 |
| 7,254,786 B2 * | 8/2007 | Henriquez | 715/835 |
| 7,428,756 B2 * | 9/2008 | Wookey | 726/26 |
| 7,543,188 B2 * | 6/2009 | Devas et al. | 714/38.14 |
| 7,716,640 B2 | 5/2010 | Pik et al. | |
| 8,060,855 B2 * | 11/2011 | Hegde et al. | 717/103 |
| 8,091,066 B2 | 1/2012 | Fiore | |
| 2004/0230982 A1 * | 11/2004 | Wookey | 718/106 |
| 2004/0268364 A1 * | 12/2004 | Faraj | 719/316 |
| 2006/0111888 A1 * | 5/2006 | Hiew et al. | 703/22 |
| 2006/0155740 A1 | 7/2006 | Chen et al. | |
| 2006/0277528 A1 * | 12/2006 | Chen et al. | 717/124 |
| 2007/0038982 A1 * | 2/2007 | Andrews et al. | 717/124 |
| 2008/0059943 A1 * | 3/2008 | Krevs et al. | 717/103 |
| 2008/0127034 A1 * | 5/2008 | Pasricha et al. | 717/100 |
| 2008/0201453 A1 * | 8/2008 | Assenmacher | 709/219 |
| 2008/0313549 A1 * | 12/2008 | Stoyanov et al. | 715/749 |
| 2009/0077556 A1 * | 3/2009 | Nohr | 718/101 |
| 2009/0094572 A1 * | 4/2009 | Hegde et al. | 717/101 |
| 2009/0106731 A1 * | 4/2009 | Coulthard et al. | 717/101 |
| 2009/0132995 A1 * | 5/2009 | Iborra et al. | 717/106 |
| 2009/0234478 A1 * | 9/2009 | Muto et al. | 700/94 |
| 2010/0036914 A1 * | 2/2010 | Chesta | 709/205 |
| 2010/0192121 A1 * | 7/2010 | Unnithan et al. | 717/103 |

(Continued)

OTHER PUBLICATIONS

"C/C++ Remote Development—NetBeans IDE 6.9 Tutorial", retrieved Jul. 24, 2012; retrieved from the Internet http://netbeans.org/kb/docs/cnd/remotedev-tutorial.html.

(Continued)

*Primary Examiner* — Don Wong
*Assistant Examiner* — Roberto E Luna
(74) *Attorney, Agent, or Firm* — Cantor Colburn LLP; Edward Choi

(57) ABSTRACT

A method implemented by a processor and a system develop a software project targeting one or more remote systems. The method includes generating a project on a local system, which includes receiving user input through a user interface. The project includes one or more source files. The method also includes generating one or more remote contexts corresponding to the one or more remote systems.

14 Claims, 11 Drawing Sheets

(56) References Cited

U.S. PATENT DOCUMENTS

| | | | | |
|---|---|---|---|---|
| 2010/0325557 | A1* | 12/2010 | Sibillo | 715/751 |
| 2011/0161928 | A1* | 6/2011 | Sangra et al. | 717/115 |
| 2011/0283257 | A1* | 11/2011 | Charisius et al. | 717/109 |
| 2011/0319056 | A1* | 12/2011 | Toy et al. | 455/412.2 |
| 2013/0031536 | A1* | 1/2013 | De et al. | 717/146 |
| 2014/0157226 | A1* | 6/2014 | Dykstal et al. | 717/101 |

OTHER PUBLICATIONS

"Eclipse Remote Development Guidelines (Draft)", retrieved Jul. 24, 2012; retrieved from the Internet http://www.eclipse.org/eclipse/platform-core/documents/2.0/remote-development.html.

Anonymous, "Hybrid local/remote filesystem" retrieved from Prior Art Database, ip.com, May 28, 2012, pp. 1-5.

IBM, "IDE projects for simultaneous multi-platform development" retrieved from Prior Art Database, ip.com, Nov. 5, 2004, pp. 1-3.

\* cited by examiner

FIG. 10

MULTI-CONTEXT REMOTE DEVELOPMENT

BACKGROUND

The present invention relates to software development, and more specifically, to software development targeting multiple remote systems.

An integrated development environment (IDE) is a software application that facilitates software development. An IDE may include, for example, a source code editor, build automation tools, and a debugger, where the source code includes instructions on how a program should operate. Typically, a set of source files are fed to a build tool (e.g., compiler) that produces output such as intermediate objects, libraries, executable files, or some combination thereof. Historically, build output was designed to be used on the same workstation as the IDE used to develop the source files. More recently, some development environments facilitate the production of build outputs that run on systems that are remote to the workstation on which the IDE resides.

For example, by including a cross-compiler, the build tool of the IDE may produce output designed to be used on a platform other than the one on which the build was done. Some languages, such as Java, for example, produce build output that can run on any platform. Thus, when developing source code in those languages, with the cross-compiler approach, the local build tool is sufficient to produce the necessary output. However, platform-neutral languages like Java are not common, and it can be difficult to find the necessary cross-compiler for a given language/platform combination when the language is not platform-neutral. In addition, without additional remote instrumentation, the build result according to the approach above is not automatically provided to a target remote machine.

Another approach involves running the build on a target remote system rather than on the local platform that includes the IDE used to develop the source code. In this case, the source code must be available on the remote host in order to run the build. Thus, the source code must either be developed remotely (developed on the remote platform using the IDE on the local platform) or the local project source code must be synchronized to the remote system. This type of direct remote development is supported by some IDEs. Alternatively, a push/pull mechanism is used to transfer files between the local system and remote host. However, this approach is limited to targeting a particular remote host and platform.

SUMMARY

According to one embodiment of the present invention, a method implemented by a processor to develop a software project targeting one or more remote systems includes generating a project on a local system, the generating the project including receiving user input through a user interface and the project including one or more source files; and generating one or more remote contexts corresponding to the one or more remote systems.

According to another embodiment of the invention, a software development environment to develop a software project targeting one or more remote systems includes a development application implemented by a processor, the development application facilitating the generation of a project; a remote context subsystem implemented by the processor, the remote context subsystem facilitating the generation of one or more remote contexts corresponding with the one or more remote systems; and a memory device configured to store the project and the one or more remote contexts.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 10 is another exemplary view of the synchronization page shown in FIG. 8.

DETAILED DESCRIPTION

As noted above, a platform-neutral language or cross-compiler may be used to produce a build output (on a local platform) that can be run on a remote system. Alternatively, the build may be run remotely. However, while these approaches may facilitate targeting a particular remote host and platform, a development project may be intended to work across multiple platforms or in a distributed fashion on several machines simultaneously. Embodiments of the invention described herein describe a system and method by which a single project or other type of local resource in an IDE can target multiple environments, platforms, and locations seamlessly and concurrently.

Figure 1:
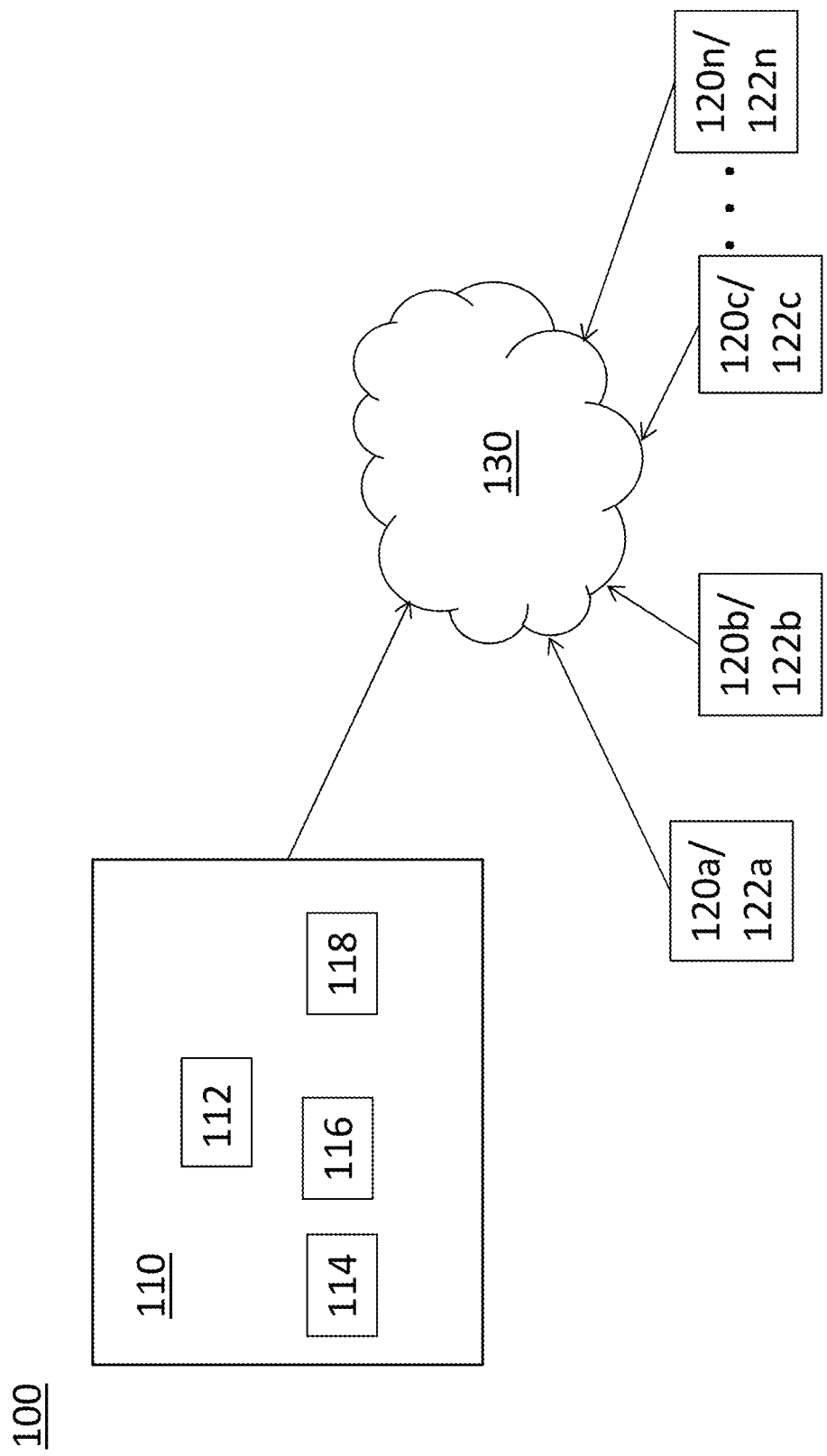
FIG. 1 is a block diagram of a software development system according to an embodiment of the invention.

FIG. 1 is a block diagram of a software development system 100 according to an embodiment of the invention. The software development system 100 includes a local system 110 which runs on a local platform. The local system 110 includes one or more processors 112 that run the IDE and other applications, including the local build tool. The local system 110 also includes one or more memory devices 114, a user interface 116, and an output device 118, which may include a display. The one or more memory devices 114 store the local project (set of related file resources including the source code) and other files. The local system 110 may be connected to remote systems 120 directly or via a network 130 as shown in FIG. 1. The various remote systems 120 may run on different platforms than the local system 110.

As discussed above, prior techniques facilitate targeting one of the remote systems 120 with a project developed on the local system 110. In that situation, a mapping between the local project (on the local system 110) and the remote location 122 (location of the targeted remote system 120) is sufficient. The remote location 122 on the corresponding remote system 120 may include, for example, host information and a file system path when the remote system 120 is a UNIX system. Properties such as build commands, compiler options, and environment variables corresponding to the targeted remote system 120 may easily be maintained at the project level. That is, the local project maintains properties while the remote location 122 of the targeted remote system 120 is used for operations performed on the targeted remote system 120, such as uploading and downloading resources and invoking compilers. As also discussed above, embodiments of the invention contemplate remote development on more than one remote location 122 with a project. Consequently, using remote locations 122 for each of the targeted remote systems 120 is insufficient. While a project associated with multiple remote locations 122 may gain the added ability to push and pull resources to and from each of the remote locations 122, remote operations with properties maintained by the project would suffer from the complexity of having to account for different target environments for each remote location 122. For example, the build command and environment variables for one of the remote locations 122a may be different than those needed for another remote location 122b. Thus, even if a project were only used for pushing and pulling resources, the project would have to account for different synchronization states between project resources and remote locations 122.

Figure 2:
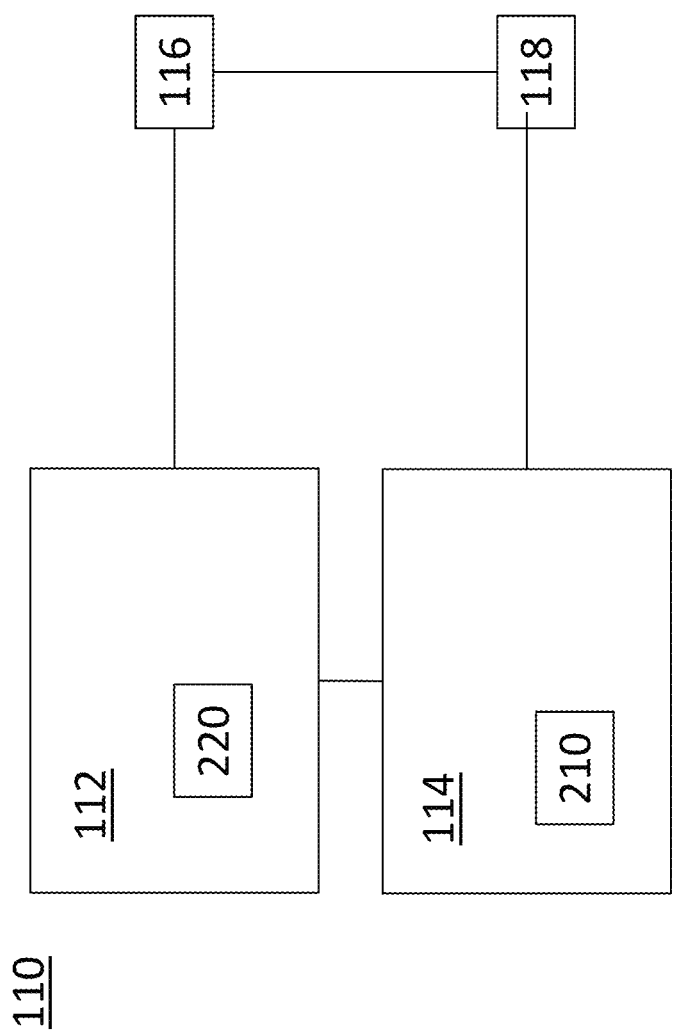
FIG. 2 is a block diagram detailing the local system according to the embodiment shown in FIG. 1.

FIG. 2 is a block diagram detailing the local system 110 according to the embodiment shown in FIG. 1. Rather than having each project maintain separate arrays of properties corresponding to a given remote location 122, embodiments of the invention use an independent construct referred to as a remote context 210, which is stored in the memory device 114 of the local system. In alternate embodiments, the remote context 210 may be stored in a location accessible to the local project over the network 130. A remote context 210, like a remote location 122, describes a host and a location on the host. However, unlike a remote location 122, a remote context 210 is an independent entity, is platform-neutral, includes additional properties from a remote location 122, can be contributed to, and can be interacted with directly by users in an IDE through the user interface 116 and output device 118. Remote contexts 210 are created and managed by a remote context subsystem 220 run on the processor 112. A single remote context subsystem 220 may support more than one type of remote context 210. A remote context 210 may have contributions like additional property pages and menu contributions. For example, a shell may be started from a selected remote context 210, preset with environment variables that were specified in the environment property page for the remote context 210.

Figure 3:
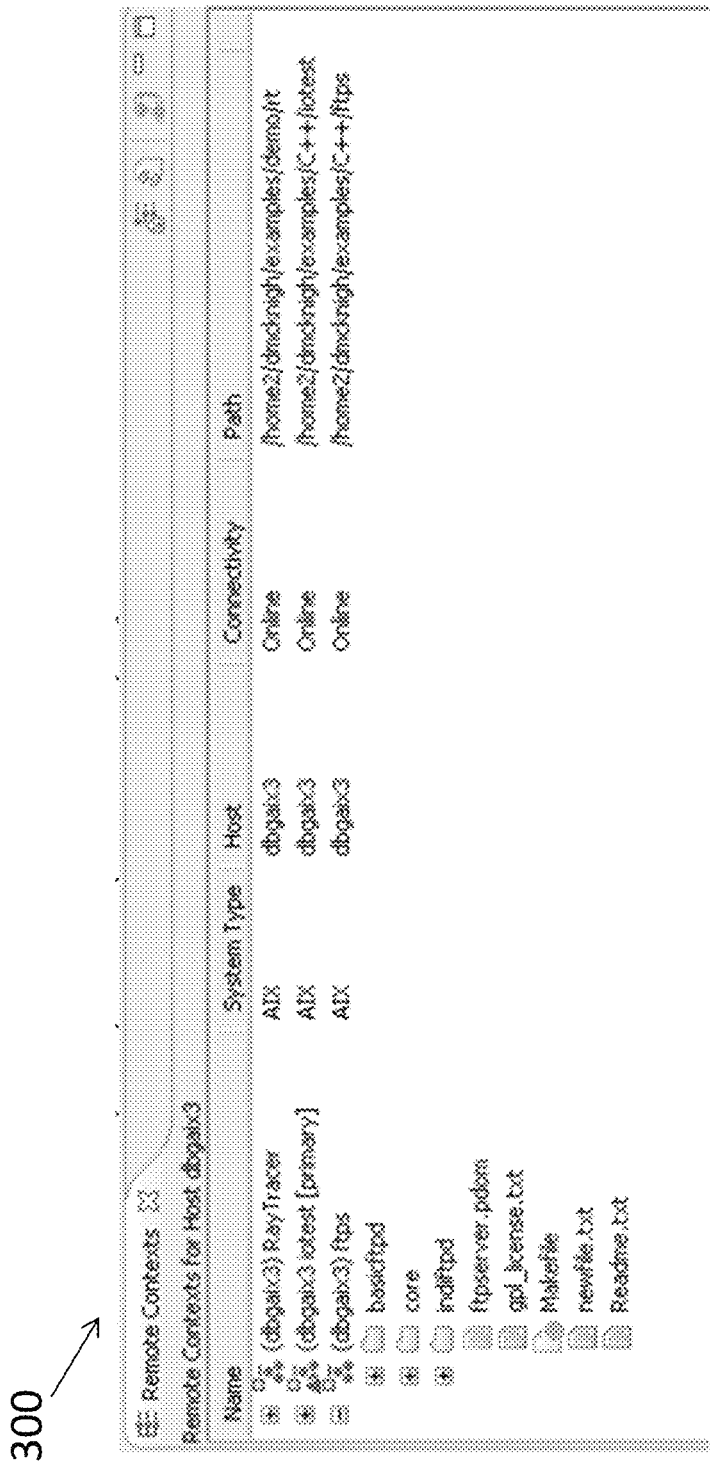
FIG. 3 illustrates an exemplary remote contexts view according to an embodiment of the invention.
Figure 4:
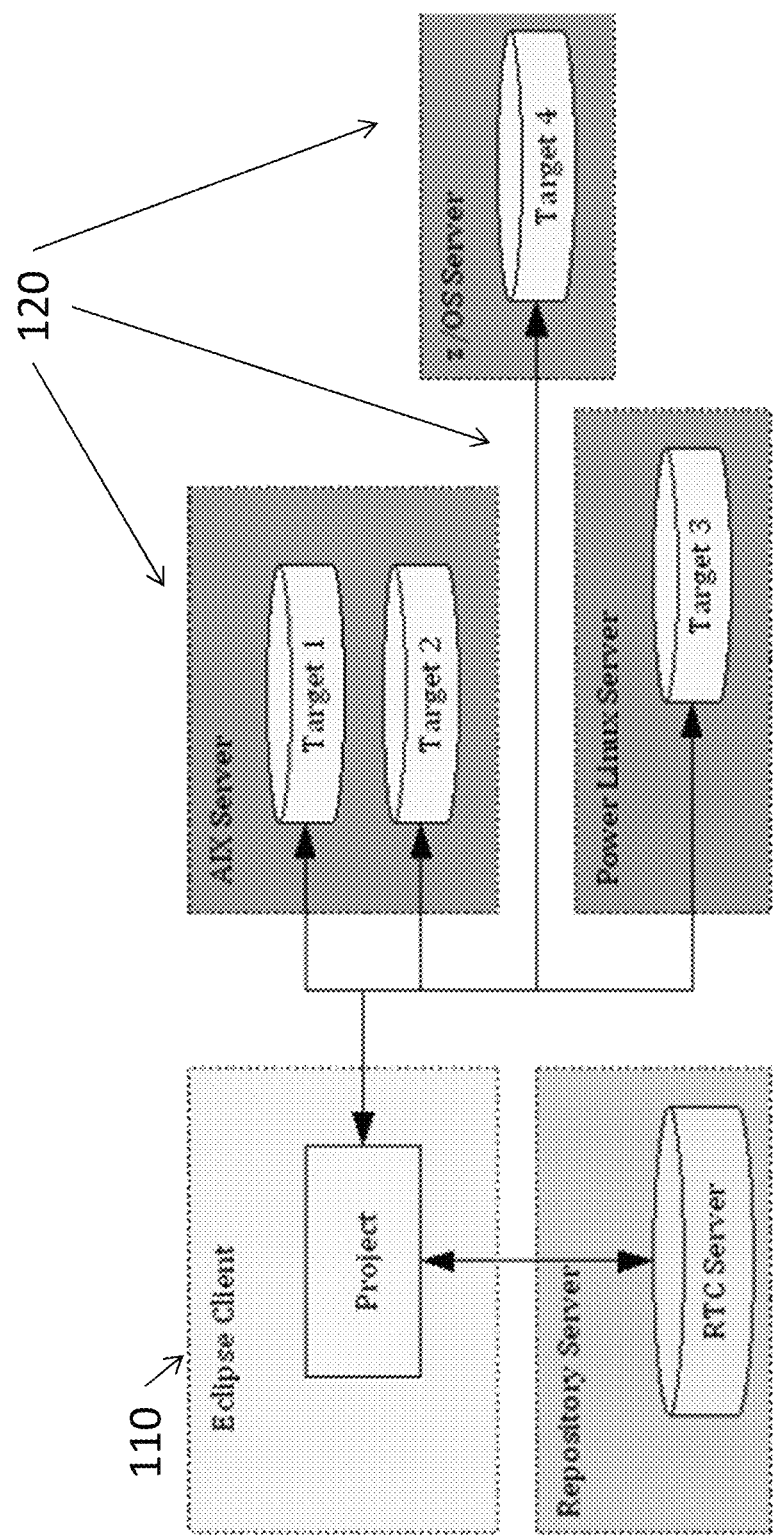
FIG. 4 illustrates an exemplary 1-to-N mapping between a local project on a local system and a set of remote contexts on remote systems according to embodiments of the invention.

FIG. 3 illustrates an exemplary remote contexts view 300 according to an embodiment of the invention. The remote contexts view 300 facilitates a user working with only the contexts and provides a way to access desired remote resources in a similar way that a project explorer view provides a way to work with local resources. The remote contexts view 300 also provides a way to work with remote contexts 210 associated with a given project. Each remote context 210 maintains project-to-context synchronization state information. Synchronization state of each local project resource with respect to each remote context 210 refers to time stamps, whether they are in synchronization, local changes, remote changes, and conflicts between the project and remote. Each remote context 210 may also maintain build commands and environment variables for the associated remote system 120. The remote contexts view 300 associated with a given project illustrates the 1-to-N mapping between the local project and a set of remote contexts 210 facilitated by embodiments of the invention. FIG. 4 illustrates an exemplary 1-to-N mapping between a local project on a local system 110 and a set of remote contexts 210 on remote systems 120 according to embodiments of the invention.

Figure 5:
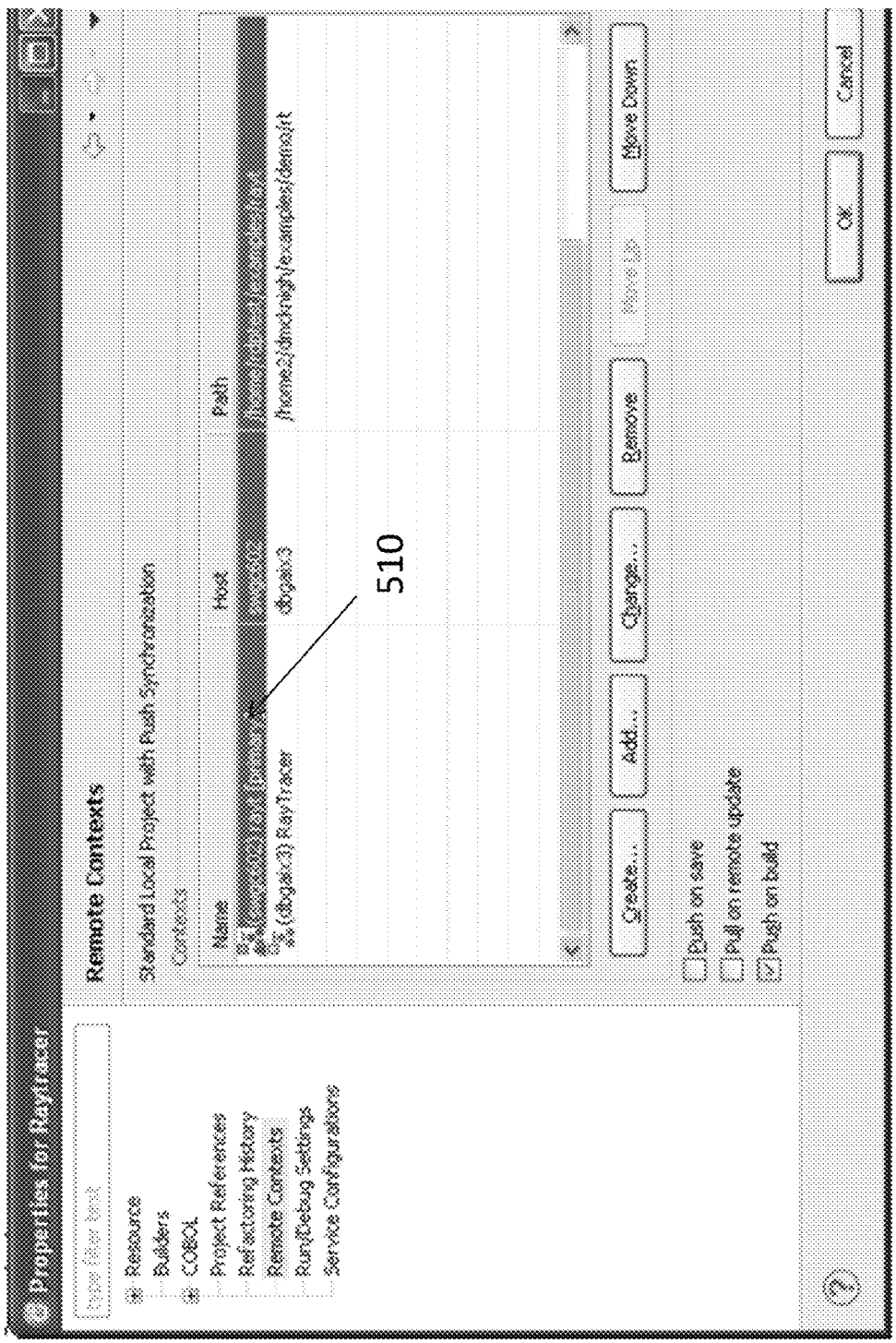
FIG. 5 is an exemplary project property page according to an embodiment of the invention.
Figure 6:
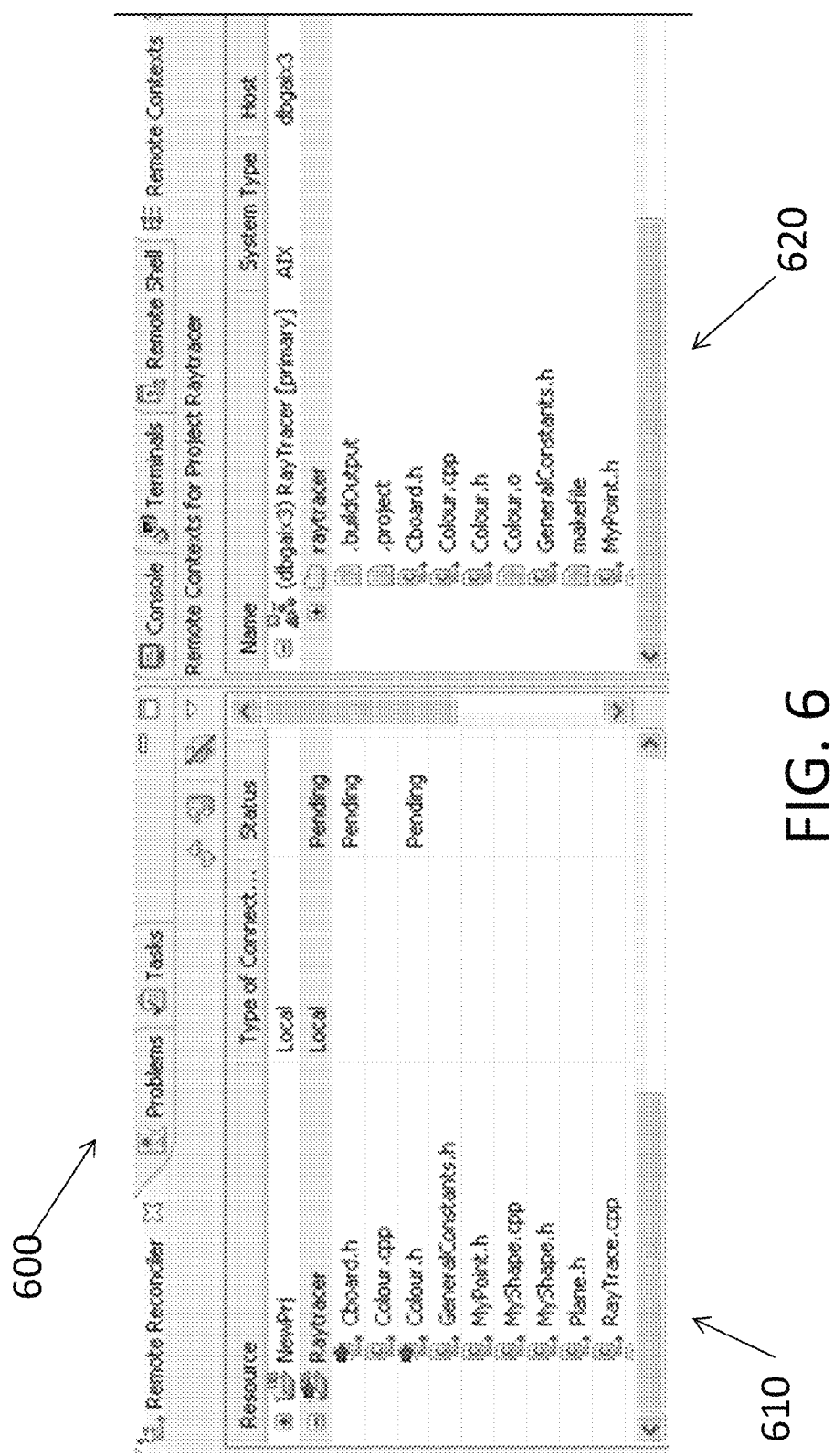
FIG. 6 is an exemplary view to facilitate management of a local project according to an embodiment of the invention.

FIG. 5 is an exemplary project property page 500 according to an embodiment of the invention. The project property page 500 illustrates multi-context project creation and, specifically, remote context 210 addition, removal, and editing. This page 500 represents an exemplary remote context subsystem 220. Resources may be pushed and pulled between the local project and corresponding remote contexts 210. In the exemplary embodiment shown in FIG. 5, the first remote context 210 is indicated as "[primary]" (primary context 510). This illustrates that, according to the exemplary embodiment, every project has a primary context 510, which is the remote context 210 that remote operations, such as build, use by default. A secondary context may be synchronized with the project but is treated differently from the primary context 510. The need for a designation of primary context 510 is premised on the fact that not all operations are suitable to be run in multiple remote contexts 210 simultaneously. For example, debugging in multiple remote contexts 210 simultaneously is typically not done or useful. Accordingly, a default remote context 210, the primary context 510 in the present embodiment, is the default designation for such operations. The remote context 210 designated as the primary context 510 may be changed as needed. That is, if a user changes the primary focus of the project, a different remote context 210 may be better-suited to be the primary context 510. The previous primary context 510 would then become a secondary remote context 210. The "Remote Contexts" view in FIG. 5 facilitates management of a project's remote contexts 210. FIG. 6 is an exemplary view 600 to facilitate management of a local project (named "Raytracer") according to an embodiment of the invention. As shown in FIG. 6, the local project (view 610) is shown alongside the corresponding remote contexts 210 (view 620).

Figure 7:
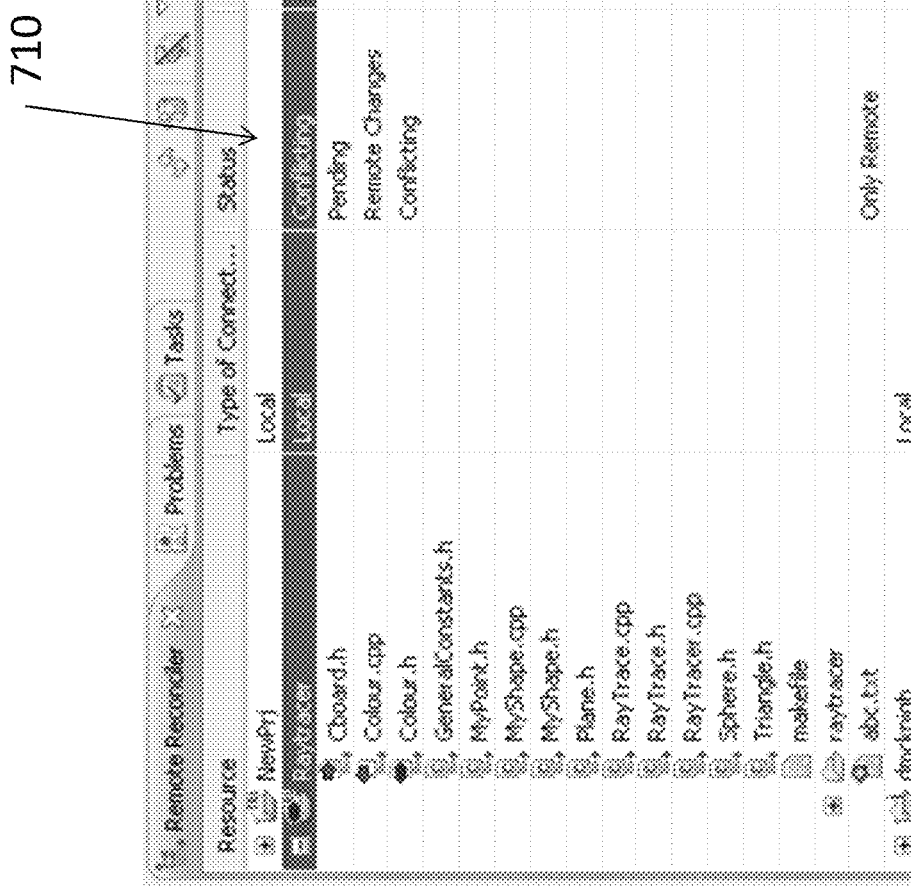
FIG. 7 illustrates synchronization states of remote contexts of an exemplary project according to an embodiment of the invention.

FIG. 7 illustrates synchronization states of a remote context 210 of an exemplary project according to an embodiment of the invention. As shown in FIG. 7, synchronization states are indicated per project file as well as per remote context 210. When a project targets a single remote location 122, synchronization is relatively straightforward. Timestamps may be stored in project metadata indicating the local resource timestamp at the time of last upload as well as the corresponding remote system 120 timestamp at the time of the last download. The timestamp information may be used to determine whether resources are synchronized or not. If the stored timestamps do not match actual timestamps, then pending changes, remote changes, and conflicts are thereby detected. However, when a project targets multiple remote contexts 210, a remote system 120 associated with one remote context 210 will have different timestamps than another remote system 120 associated with another remote context 210. According to embodiments of the invention, a user may synchronize the local resources with a single remote context 210 at a time or with multiple remote contexts 210 at a time. When a user works with a single remote context 210 at a time, download timestamps would vary from context-to-context even though the stored upload timestamps (those associated with the project) would be the same for all the remote contexts 210. The stored timestamps used to indicate synchronization states should be unique for each remote context 210. Thus, according to embodiments of the invention, each remote context 210 may store its own context-specific synchronization information. Resources may be synchronized as well as pushed and pulled to/from a single remote location 120. A synchronization operation would reveal any conflicts, remote updates and/or pending local changes between the project and a remote context 210. The synchronization state between the project and the primary context 510 is shown in FIG. 7 (synchronization state shown in column 710). Because the synchronization state is context-sensitive, viewing the synchronization state for multiple remote contexts 210 at one time is not particularly useful and may result in a confusing user experience. For example, FIG. 7 shows that there was a conflict between "Colour.h" in the local project and in the primary context 510. If additional remote contexts 210 included additional versions of "Colour.h" that conflicted with both the project version and the primary context 510 version, visual indications of those conflicts would increase the complexity of the display rather than clarify the information presented.

Figure 8:
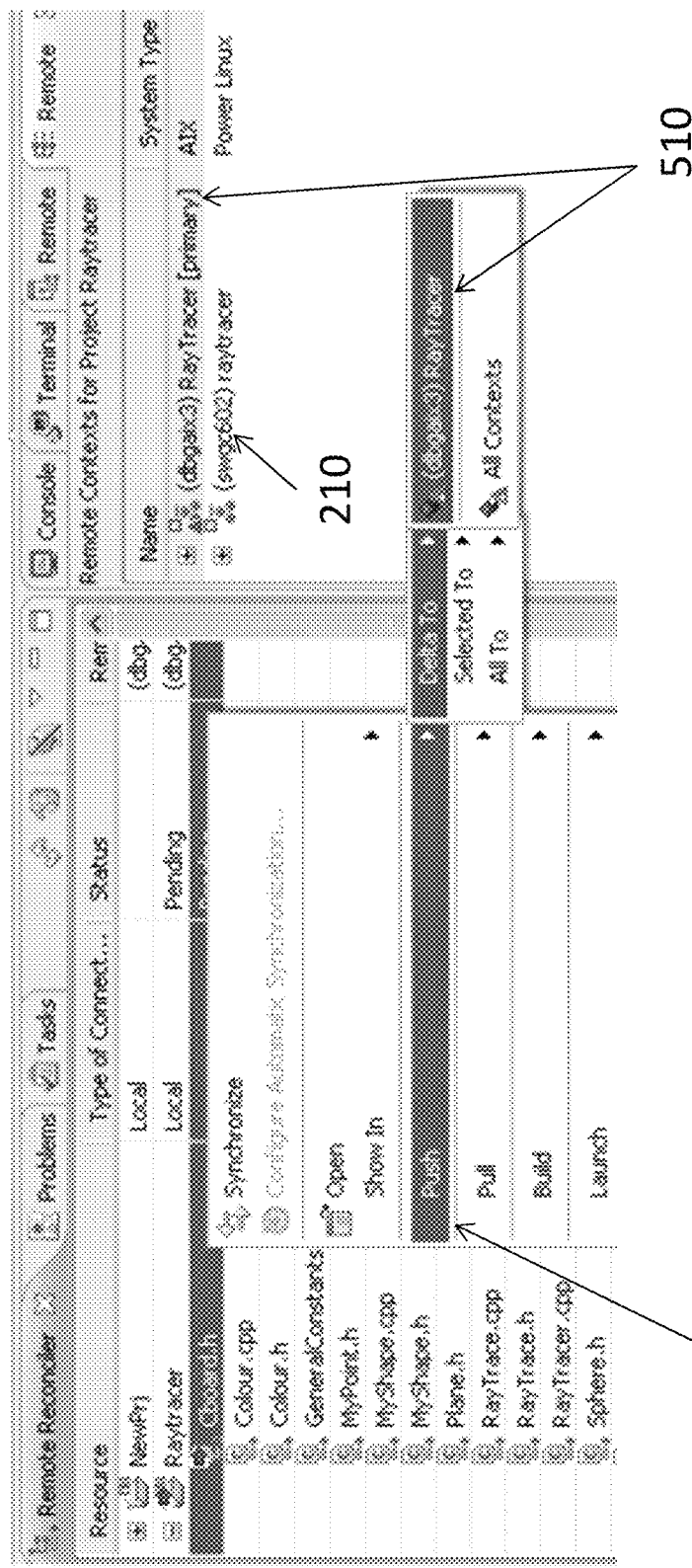
FIG. 8 is an exemplary view of a synchronization page according to an embodiment of the invention.
Figure 9:
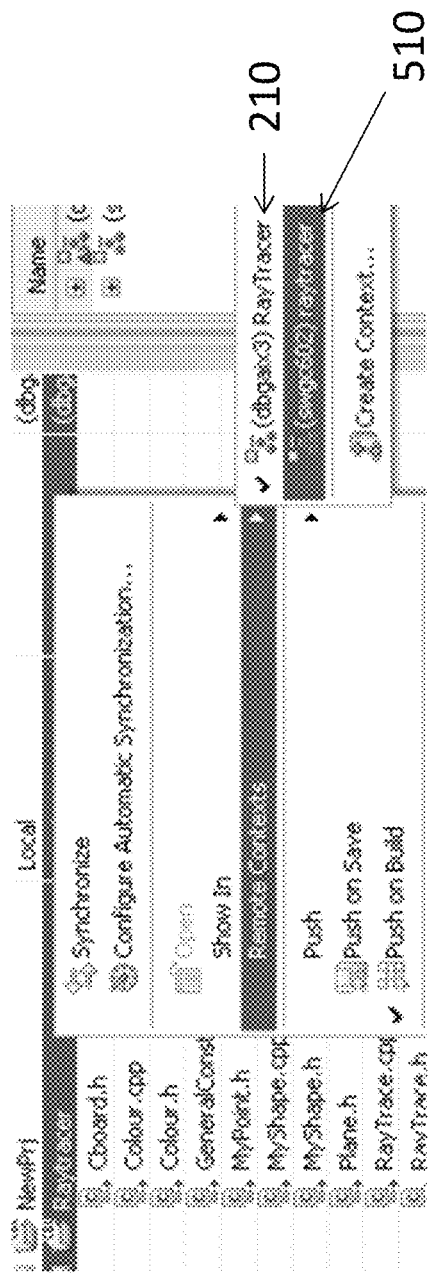
FIG. 9 illustrates the selection of a new primary context according to an exemplary embodiment of the invention.

FIG. 8 is an exemplary view 810 of a synchronization page (labeled "Remote Reconciler" in the example) according to an embodiment of the invention. This view 810 shows that conflicts or updates may be resolved one remote context 210 at a time by pushing pending changes (820) or pulling remote changes. In the exemplary view 810, a change in "Cboard.h" that was shown as "pending" in FIG. 7 is pushed to the primary context 510 (820) as shown in FIG. 8. In alternate embodiments, the pending files may be pushed to all remote contexts 210 rather than only the primary context 510. While pushing changes from the local project may be to the primary context 510 or to all remote contexts 210, pulling changes into the project and handling conflicts between files typically involves only the project and the primary context 510. FIG. 9 illustrates the selection of a new primary context 510 according to an exemplary embodiment. In the example shown by FIG. 9, the change in primary contexts 510 can be affected from the same view (810) as the conflict resolution. In the example shown in FIG. 9, the primary context 510 is changed from "(dbgaix3) RayTracer" to "(swgc602) raytracer."

Figure 10:
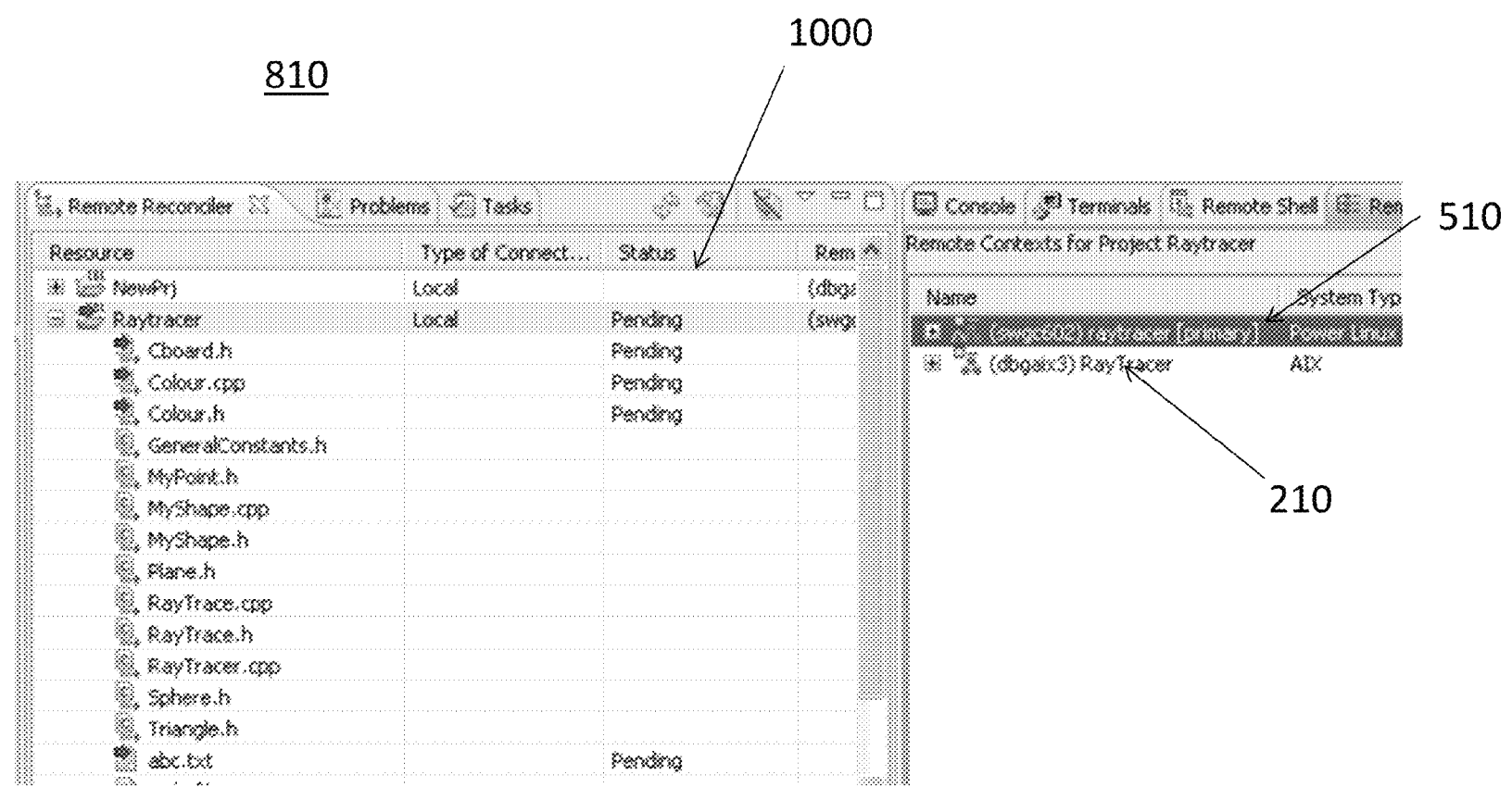

FIG. 10 is another exemplary view 810 of the synchronization page ("Remote Reconciler") shown in FIG. 8 based on the selection of a new primary context 510 as shown in FIG. 9. That is, after "(swgc602) raytracer" is selected as the new primary context 510 (as shown in FIG. 9), the project-to-context timestamp information is determined using the new primary context 510, and synchronization status between the project and the new primary context 510 is displayed (column 1000). Specifically, column 1000 would show the changes in the local project that are pending a push to the primary context 510. Column 1000 may also show remote changes that must be pulled into the project and conflicts between the project and the primary context 510. Without context-based synchronization states, switching primary contexts 510 would involve pushing all local resources and then accounting for conflicts. Because embodiments of the invention include each remote context 210 (and the primary context 510) maintaining its own synchronization state information, switching from one remote context 210 to another as the primary context 510 is facilitated without confusion in the user display.

While embodiments discussed above relate to synchronizing projects with remote contexts 210, local mapping may be generalized to more granular resources like folders or files. The additional granularity facilitates cases (e.g., web projects) in which only some portions of a project are to be pushed and/or pulled. Maintenance of remote context 210 mapping metadata may be provided for arbitrary resources to facilitate user association of a remote context 210 with an arbitrary local resource.

A remote operation (operation, such as a build, on a remote system 120) may use properties maintained by the corresponding remote context 210. For example, a build may use environment variables for a given remote context 210 to indicate what options to use during a compile of the source code. Even if build options were maintained independently of the corresponding remote contexts 210, the configuration may still be associated with the corresponding remote context 210. For example, a unique identifier may be stored for the configuration as a property of the corresponding remote context 210. In this way, each remote context 210 may be associated with a different kind of build (e.g. debug/opt, OS-specific, tool-specific).

A build may be performed on one remote context 210 at a time or on multiple remote contexts 210. The build may be performed in the remote location 122 and the errors, warnings, and information messages generated by the build may be brought back to the local system 110 for display to the user via the output device 118. Embodiments that include performing the build on the remote system 120 avoid the need for a cross-compiler in the local system 110. Eclipse error markers for each error may be associated with the local project resource that corresponds to the remote resource presenting an issue for the compiler. When the primary context 510 is changed, the errors, warnings, and informational messages produced during the build for the previous primary context 510 may no longer be valid. However, the information need not be entirely discarded because the user may return to the previous primary context 510 as the primary context 510 once again. As with timestamps used for synchronization, build-related messages may be stored as context-specific properties in the respective remote contexts 210. When build-related messages are stored in association with the remote context 210, displaying the relevant messages when a user changes the primary context 510 is facilitated. When a user elects to build for all remote contexts 210 at once, a separate build is initiated for each remote context 210. When all the builds are complete, the errors, warnings, and informational messages may be displayed by context or amalgamated into a single set of project markers. In embodiments including the amalgamated listing of project markers, when the same error is detected in multiple remote contexts 210, a single error may be displayed for ease of viewing.

Figure 11:
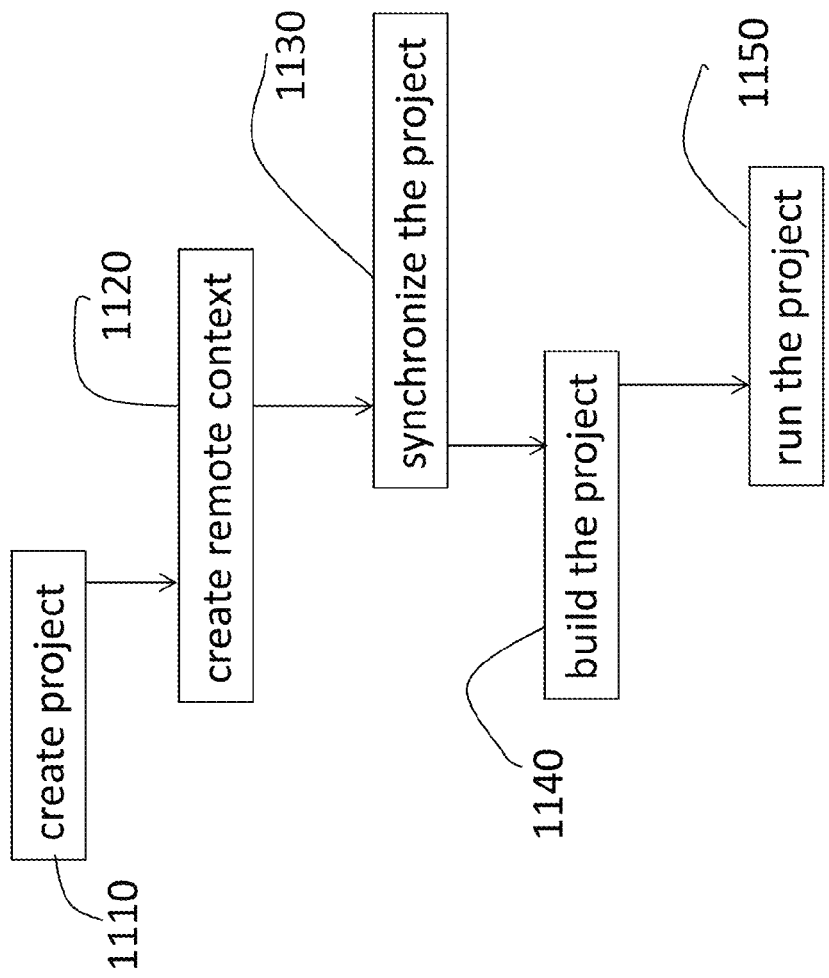
FIG. 11 is a flow diagram of an exemplary method according to an embodiment of the invention.

FIG. 11 is a flow diagram of an exemplary method 1100 according to an embodiment of the invention. At block 1110, creating a project on a local system 110 includes generating source code. At block 1120, creating one or more remote contexts 210 facilitates targeting one or more remote systems 120 with the project according to embodiments of the invention. This block represents using a remote context subsystem 220 run by the processor 112 of the local system 110. As detailed above, each remote context 210 is an independent entity with regard to the project and is platform-neutral. Each remote context 210 corresponds with one or more remote systems 120. The remote context subsystem 220 facilitates user input through the user interface 116 to create and modify remote contexts 210. At block 1130, synchronizing the project includes synchronizing the project with each remote context 210, one at a time with a designated primary context 510 or all at once. Each remote context 210 maintains its respective project-to-context synchronization state information and the information may be displayed per remote context 210 or for all remote contexts 210 through the output device 118. At block 1140, building the project includes building for each remote context 210 one at a time with a designated primary context 510 or all at once. Each remote context 210 maintains its respective build messages which may be displayed per remote context 210 or for all remote contexts 210 through the output device 118. Once the build process is completed, the project may be run on one or more of the remote systems 120.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagram depicted herein is just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method implemented by a processor to develop a software project targeting two or more remote systems, the method comprising:
   generating, using the processor, a project on a local system, the generating the project including receiving user input through a user interface and the project including one or more source files;
   generating, at the local system, two or more remote contexts corresponding to the two or more remote systems, the two or more remote contexts facilitating targeting the two or more remote systems with the one or more source files of the project on the local system; and
   synchronizing one or more of the two or more remote contexts with the project, the synchronizing including determining a synchronization state which indicates pending changes and conflicts between the project and the respective remote context.

2. The method according to claim 1, wherein the generating the two or more remote contexts includes a user creating or modifying the two or more remote contexts through the user interface.

3. The method according to claim 1, further comprising storing the synchronization state in association with each of the one or more of the two or more remote contexts and displaying the synchronization state for each of the one or more of the two or more remote contexts one at a time.

4. The method according to claim 1, further comprising storing the synchronization state in association with each of the one or more of the two or more remote contexts and displaying the synchronization state for the one or more of the two or more remote contexts together.

5. The method according to claim 1, wherein the synchronizing includes resolving issues indicted by the synchronization state for the project and the respective remote context.

6. The method according to claim 5, wherein the resolving the issues includes pushing changes in the project to the remote context, pulling changes in the remote context to the project, and addressing conflicts between the project and the remote context using the user interface.

7. The method according to claim 1, further comprising building the project to run on one or more of the two or more remote systems using build information in the corresponding remote context of the one or more of the two or more remote systems.

8. The method according to claim 7, further comprising storing the build information in association with each of the one or more of the two or more remote contexts and displaying the build information for each of the one or more of the two or more remote contexts one at a time.

9. The method according to claim 7, further comprising storing the build information in association with each of the one or more of the two or more remote contexts and displaying the build information for the one or more of the two or more remote contexts together.

10. A software development environment to develop a software project targeting one or more remote systems, the system comprising:
    a development application implemented by a processor, the development application facilitating the generation of a project on a local system;
    a remote context subsystem implemented by the processor, the remote context subsystem facilitating the generation of two or more remote contexts corresponding with the two or more remote systems, the two or more remote contexts facilitating targeting the two or more remote systems with the project on the local system;
    a memory device configured to store the project and the two or more remote contexts; and
    a synchronization module implemented by the processor, wherein the synchronization module synchronizes the project with each of the two or more remote systems using respective synchronization state information.

11. The system according to claim 10, wherein the memory device stores source code included in the project.

12. The system according to claim 10, wherein the memory device stores the synchronization state information corresponding with each file of each of the two or more remote contexts.

13. The system according to claim 10, further comprising a communication module communicating with the two or more remote systems, wherein the communication module receives build information for a build of the project on one or more of the two or more remote systems.

14. The system according to claim 13, wherein the build information is stored in association with the corresponding remote context.

\* \* \* \* \*